United States Patent

Hugyecz et al.

[15] 3,688,038

[45] Aug. 29, 1972

[54] STORED ENERGY SIGNALLING CIRCUIT

[72] Inventors: Matyas Hugyecz; Carroll S. Richmond, both of Rochester, N.Y.

[73] Assignee: Stromberg-Carlson Corporation, Rochester, N.Y.

[22] Filed: April 12, 1971

[21] Appl. No.: 133,296

[52] U.S. Cl. ....................179/84 R

[51] Int. Cl. ....................H04m 1/26

[58] Field of Search ....................179/84 R, 84 A, 99

[56] References Cited

UNITED STATES PATENTS

| | | | |
|---|---|---|---|
| 3,539,732 | 11/1970 | Weissenberg | 179/84 R |
| 3,406,262 | 10/1968 | Grandstaff | 179/84 R |
| 3,471,651 | 10/1969 | Saia | 179/84 A |

*Primary Examiner*—Kathleen H. Claffy
*Assistant Examiner*—William A. Helvestine
*Attorney*—Charles C. Krawczyk

[57] ABSTRACT

A signalling circuit for telephone sets utilizes ringing signals applied thereto to enable a control device, such as a transistor, to pass energy through a signalling device, such as a ringer, thereby actuating it during the ringing cycle. When used in conjunction with one telephone line, the energy is supplied from an energy storage means in the circuit, such as a capacitor, which receives and stores the charge from the telephone line. When used in conjunction with a plurality of telephone lines, the ringing signal on one of the lines enables the control device to pass energy through the ringer from the other telephone lines. A capacitor connected to receive and store energy from all the connected telephones can be used to supplement the energy supplied from the telephone lines.

16 Claims, 2 Drawing Figures

PATENTED AUG 29 1972 3,688,038

M. HUGYECZ
C.S. RICHMOND
INVENTORS

BY Charles C. Krawczyk
ATTORNEY

STORED ENERGY SIGNALLING CIRCUIT

BACKGROUND OF THE INVENTION

This invention relates in general to telephone signalling circuits and, in particular, to a ringing arrangement for telephone sets that are connected to a plurality of telephone lines.

In recent years there has been an increased emphasis on the use of more sensitive and faster responding control devices in telephone systems to provide quicker and better service. The prevalence of longer telephone lines and the use of smaller conductors to economize on the high cost of copper have resulted in greater line impedances which reduce the amount of current available to actuate these control devices. This has created an even greater need for more sensitivity in these control devices since smaller actuating currents must be detected. This has produced a situation wherein these control devices will improperly respond to signals not intended to actuate the control devices.

Specifically, it has been found that alternating current (AC) ringing signals can undesirably actuate a ring trip relay (means to detect when a called party answers the telephone so as to terminate the ringing signal), prematurely disconnecting the circuit and terminating the ringing before the called party has answered the telephone. This situation is aggravated whenever there are two or more telephone receivers connected in parallel (such as common audible circuits) so that all receive the AC ringing signal simultaneously. This is so because the combination of telephone receivers present a lower input impedance to the telephone lines than a single receiver would, thus, drawing a greater ringing signal current.

In addition to the foregoing, when several telephone lines are connected in a key telephone arrangement wherein a plurality of telephones are connected to a plurality of lines and each telephone includes a signal ringer for all lines, the additional capacitance of the lines and the parallel ringers apply a large load to the ringing circuit further aggravating the problem. The problem is even further aggravated at present in that only one of the connected telephone lines supplies all the energy necessary to operate all the ringers since all the energy is provided by the ringing signal itself.

It is an object of the invention to provide a new and improved signalling circuit for telephone sets for exhibiting a greater input impedance to the connected telephone line thereby reducing the amount of current drawn from the telephone line for signalling purposes.

It is a further object of the invention to provide a new and improved signalling circuit for telephone sets connected to a plurality of telephone lines wherein during the ringing signal in one of the telephone lines each of the other telephone lines supplies a share of the current needed to actuate the signalling device.

It is still a further object of the invention to provide a new and improved signalling circuit for telephone sets including an energy storage means which is used to supplement the telephone lines for supplying the necessary energy for actuating the signalling device.

BRIEF DESCRIPTION OF THE INVENTION

The signalling circuit of the invention is designed to be used in a telephone set which is connected to one or more telephone lines. The signalling circuit includes a switching circuit which controls the flow of energy through a signalling device, such as a ringer, in response to receiving telephone ringing signals. The circuit means connecting the switching circuit to the telephone lines is such that the signalling circuit presents a high impedance to the telephone lines, thus, minimizing the current drawn for ringing purposes.

In accordance with a first embodiment of the invention wherein the signalling circuit is connected to a single telephone line, the energy for actuating the signalling device is supplied entirely from an energy storage means, such as a capacitor, coupled to the telephone line and the switching circuit. The capacitor receives and stores energy drawn from the telephone line and discharges the energy through the signalling device under the control of the switching circuit during the signalling period.

In accordance with a second embodiment of the invention wherein the signalling circuit is connected to a plurality of telephone lines, energizing potential for actuating the signalling device is continuously supplied from all the lines, except that one which carries the ringing signal.

A further feature of the invention as depicted in the second embodiment is an energy storage means, such as a capacitor, coupled to the telephone lines and the switching circuit for providing additional energy for actuating the signalling device. The capacitor receives and stores energy from the telephone lines and discharges the energy through the signalling device together with the energy supplied from the telephone lines during the signalling period.

DESCRIPTION OF THE PREFERRED EMBODIMENTS

Figure 1:
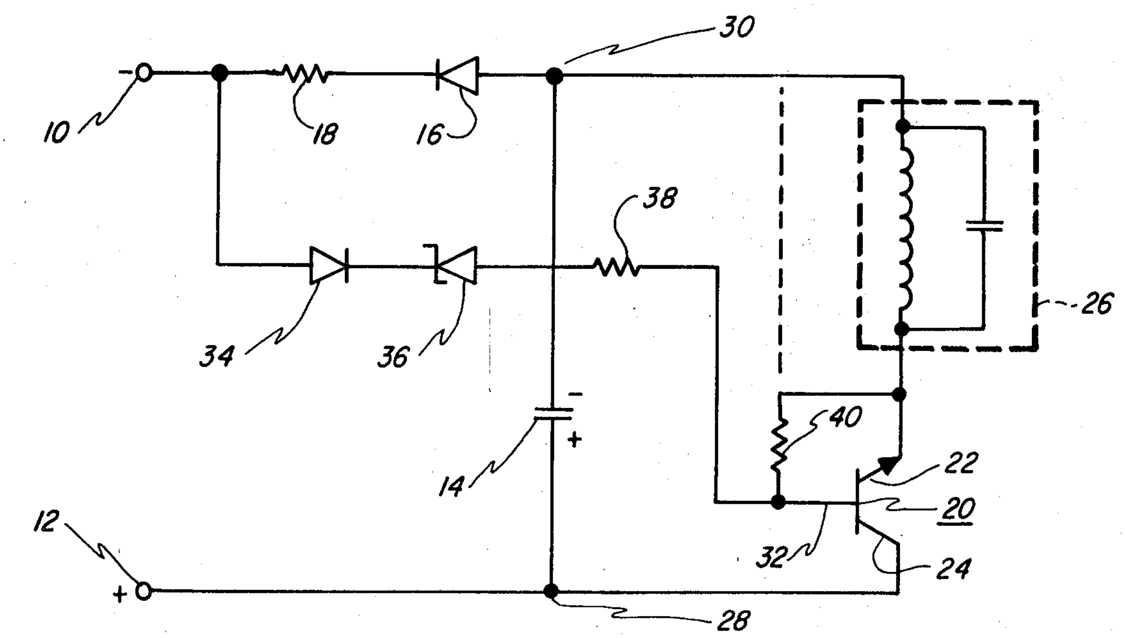
FIG. 1 is a schematic diagram of the basic signalling circuit of the invention adapted for connection to a single telephone line.

Shown in FIG. 1 is a basic signalling circuit of the invention which is adapted for connection to a telephone line through a pair of input terminals 10 and 12. Connected in series between the input terminals 10 and 12 are a capacitor 14, a unidirectional current conduction device 16, such as a diode, and a current limiting resistor 18, under an arrangement wherein the capacitor 14 is charged by a potential across the terminals 10 and 12 whenever terminal 10 is negative with respect to terminal 12. The resistor 18 is designed to provide a high input impedance and could be eliminated dependent on the circuit design requirements.

The circuit incorporates a three terminal control device 20, such as a transistor, wherein one terminal is used to control the flow of current between the other two terminals. The emitter 22 and the collector 24 of the transistor 20 are connected in series with a signalling device 26, such as a buzzer, ringer, light source, or the like, and wherein the series circuit is connected across the capacitor 14 at points 28 and 30. Although the signalling device 26 is shown preferably connected between the emitter 22 and point 30, it can also be connected into the circuit between the collector 24 and point 28.

The base 32 of the transistor 20 is connected to the input terminal 10 through a series circuit consisting of a unidirectional current conduction device 34, such as a diode, a voltage breakdown device 36, such as a zener diode, and a current limiting resistor 38. These series elements are designed to protect the transistor 20 from over voltages and excessive currents which might otherwise cause damage. If these conditions prove to be no problem to the specific transistor used in the design, the diode 34, zener diode 36 and resistor 38 can be eliminated. A biasing resistor 40 is connected preferably between base 32 and emitter 22, or alternatively, between base 32 and point 30 (as designated by the dashed line). Should leakage current prove to be no problem to the transistor 20, the resistor 40 can be eliminated.

A direct current (DC) voltage applied across the input terminals 10 and 12 from the telephone line, wherein terminal 10 is negative with respect to terminal 12, charges the capacitor 14 through the diode 16 in the polarity indicated. When an alternating current (AC) ringing signal having a peak amplitude greater than the DC voltage is applied to the input terminals 10 and 12, a reversal of polarity across the terminals 10 and 12 occurs once every cycle. During the polarity reversal, the diode 16 is rendered non-conductive and the diodes 34 and 36 are rendered conductive to apply a forward bias to transistor 20. The transistor 20 is then rendered conductive to discharge the capacitor 14 through the signalling device 26 thereby actuating the device. When the polarity of the potential across terminals 10 and 12 changes to its original condition (terminal 10 being negative with respect to terminal 12), the conditions reverse in the diodes, thus, removing the forward bias from the transistor 20. The transistor 20 is thereby rendered non-conductive and permits the capacitor 14 to recharge. The capacitor also recharges during the silent period of the ringing cycle. This pulsing operation continues throughout the duration of the ringing signal, actuating the signalling device at the same cyclic rate as the frequency of the ringing signal.

Figure 2:
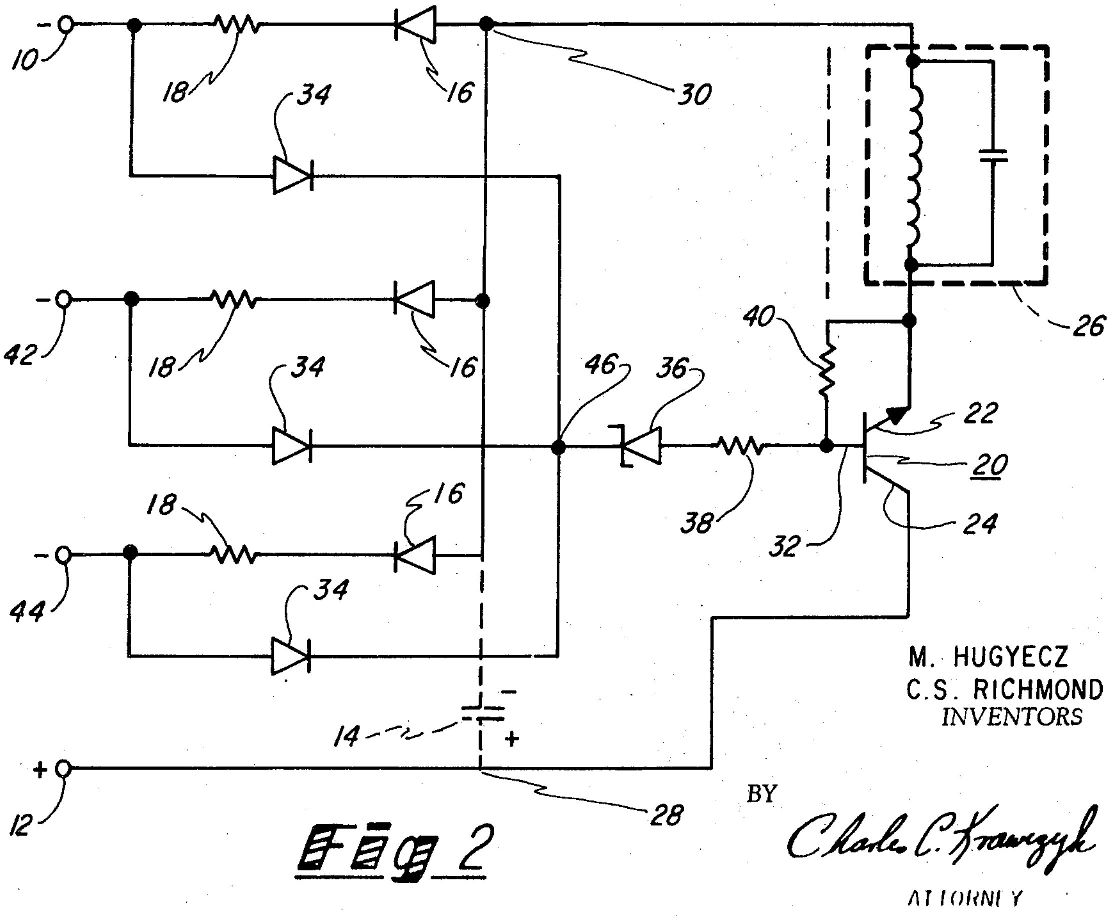
FIG. 2 is a schematic diagram of a second embodiment of the invention wherein the signalling circuit is adapted for connection to a plurality of telephone lines.

FIG. 2 shows another embodiment of the signalling circuit of the invention adapted for connection to a plurality of telephone lines (three) through four input terminals 10, 12, 42 and 44. It should be pointed out that the circuit can be readily adapted for connection to any number of telephone lines by adding input terminals and associated elements as will become apparent below. The same reference numbers have been used in FIG. 2 as were used in FIG. 1 to identify elements and terminals which are identical in both circuits.

The input terminal 12 is adapted for connection to a conductor in each of the three telephone lines. The other input terminals 10, 42 and 44 are adapted for connection to a different conductor in each of the telephone lines so that each telephone line can be connected to a separate pair of input terminals, wherein the input terminal 12 is common to all lines. The signalling device 26, the transistor 20, and the biasing resistor 40 are connected into the circuit of FIG. 2 the same as in the circuit of FIG. 1. Connected between the point 30 and each of the input terminals 10, 42 and 44 is a series circuit, each circuit comprising a diode 16 and and a current limiting resistor 18. As in the circuit of FIG. 1, the current limiting resistor 18 and the biasing resistor 40 can be eliminated if design requirements permit.

Connected between each of the input terminals 10, 42 and 44 and a common point 46 is a diode 34. Between the common point 46 and the base 32 of the transistor 20 is a series circuit comprising the zener diode 36 and the current limiting resistor 38. As previously, the zener diode 36 and the current limiting resistor 38 could be eliminated if the design requirements of the transistor 20 permit. The capacitor 14 is shown dashed in the circuit of FIG. 2, since in this configuration it is designed only to enhance the circuit operation, whereas it was a requisite element in the circuit of FIG. 1. This will be evident by the following description of how the circuit of FIG. 2 operates.

When connected to the circuit, the telephone lines apply a fixed negative DC potential across the input terminals 10, 42 and 44 with respect to the common input terminal 12. Although this potential is in a direction for the transistor 20 to conduct, the absence of a forward bias at the base 32 renders the transistor 20 non-conductive. When an AC ringing signal having a peak amplitude greater than the DC voltage, is applied to any one of the input terminals 10, 42 or 44, a reversal of polarity across that terminal and terminal 12 occurs once every cycle. During such polarity reversal, the diode 16 connected between the common point 30 and that input terminal to which the AC signal is applied becomes non-conductive. Simultaneously therewith, the zener diode 36 and the diode 34 between the common point 46 and the input terminal to which the AC signal is applied becomes conductive, applying a forward bias to the base 32 of the transistor 20. This renders the transistor 20 conductive and permits it to pass a DC current along a continuous path from the common input terminal 12 through the signalling device 26 to the two other input terminals to which the AC signal was not applied. This current actuates the signalling device 26.

When the polarity of the potential across the input terminal to which the AC signal is applied returns to its original condition (all input terminals being negative with respect to terminal 12), the conditions reverse in the diodes connected to the terminal to which the AC signal is applied, thus, removing the forward bias from the transistor 20 and thereby rendering the transistor nonconductive. The transistor 20 permits a current pulse to pass once during each cycle of the AC ringing signal. This pulsing operation continues throughout the duration of the ringing signal, actuating the signalling device at the same cyclic rate as the frequency of the ringing signal.

The current limiting resistors 18 are designed to reduce the current drawn by the circuit from the connected telephone lines. Consequently, there may not be sufficient current from the lines along to actuate the signalling device 26 when the transistor 20 is rendered conductive. To overcome this problem, the capacitor 14 is employed in the circuit of FIG. 2. The capacitor 14 operates exactly the same as in the circuit of FIG. 1, storing energy during part of the AC cycle (transistor 20 non-conductive) and discharging the energy during the other part (transistor 20 conductive). The capacitor 14, acts as a power source in conjunction with the telephone lines to ensure that sufficient current will be available for operating the signalling device. Capacitor 14 stores the required energy during the silent period of the ringing cycle. The restoration of discharged energy is provided from all the connected telephone lines thus reducing the amount of current any one telephone line is called upon to carry.

The circuits as shown in the preferred embodiments operate with a DC potential across the input terminals wherein the input terminal 12 is positive with respect to the other input terminal(s). The circuits will operate equally as well with a reversal in DC potential (viz. input terminal 12 negative with respect to the other input terminal(s)) if the NPN transistor (transistor 20) shown in FIGS. 1 and 2 is replaced with a PNP transistor and all the diodes are reversed.

It should be noted that in the circuit of FIG. 2 the common input terminal 12 can be connected to either the ground conductor or ring conductor of the telephone lines when the other input terminals 10, 42 and 44 are connected to the tip conductors. When the input terminals 10, 42 and 44 are connected to the ring conductor the common input terminal 12 is connected to the ground conductor.

As the foregoing shows, the present signalling circuit is particularly advantageous when used in conjunction with a multiplicity of telephone lines. The magnitude of current drawn by any one of the connected telephone lines is reduced not only by the higher input impedance of the circuit, but also by a sharing among the lines of the current needed for storing energy in the capacitor and for operating the signalling device. This higher input impedance and reduction in current eliminates the problem of prematurely terminating the ringing signal.

What is claimed is:

1. A signalling circuit adapted for connection to a telephone line comprising:
- a switching circuit including a signalling device;
- energy storage means;
- circuit means for coupling said switching circuit and said energy storage means to said telephone line wherein said telephone line applies a unidirectional energizing potential to said switching circuit and said energy storage means, and
- second circuit means coupling said switching circuit to said telephone line for detecting the presence of ringing signals on said telephone line to enable said switching circuit to pass current pulses through said signalling device from said energy storage means and actuate said signalling device at a frequency corresponding to the frequency of said ringing signals.

2. A circuit for actuating a signalling device in response to receiving a telephone ringing signal comprising:
- a pair of input terminals for connection to a telephone line for receiving ringing signals;
- a control device having first and second terminals which define a unidirectional controllable current path therebetween and a third terminal for controlling the current flow through said path;
- a signalling device;
- circuit means for connecting said signalling device in a series circuit with said first and second terminals of said control device between said pair of input terminals;
- a first unidirectional current conduction device connected in said series circuit and poled for conduction in the same direction as said unidirectional current path;
- capacitive means;
- circuit means connecting said capacitive means to said series circuit so that said capacitive means is charged by the conduction of said first unidirectional current conduction device and discharged by the conduction of said control device through said signalling device;
- a second unidirectional current conduction device, and
- circuit means for connecting said second unidirectional current conduction device between one of said input terminals and said third terminal of said control device so that said control device is rendered conductive to actuate said signalling device by said ringing signal when a reversal of polarity is exhibited across said input terminals.

3. A circuit as defined in claim 2 wherein said circuit means for connecting said second unidirectional device into said circuit includes a voltage breakdown device that is rendered conductive when the signal exceeds a preset amplitude.

4. A circuit as defined in claim 3 wherein resistive means is connected in said series circuit for limiting the current flow from said telephone line.

5. A circuit as defined in claim 4 wherein a biasing circuit means is connected between said third terminal of said first device and said series circuit.

6. A circuit as defined in claim 5 wherein said control device is a transistor and one end of said signalling device is connected to the emitter of said transistor and the other end of said signalling device is connected to said first unidirectional device, and
- said capacitive means is connected between the collector of said transistor and the junction of said signalling device and said first unidirectional device.

7. A signalling circuit adapted for connection to a plurality of telephone lines comprising:
- a switching circuit including a signalling device, and
- circuit means for connecting said switching circuit to said plurality of telephone lines so that upon receiving ringing signals from one of said telephone lines said circuit means enables said switching circuit to pass current pulses from the other of said telephone lines through said signalling device actuating said signalling device at a frequency corresponding to the frequency of said ringing signal.

8. A signalling circuit adapted for connection to a plurality of telephone lines comprising:
- a switching circuit including a signalling device;
- first circuit means for connecting said plurality of telephone lines to said switching circuit for applying thereto a unidirectional energizing potential from each of said telephone lines, and
- second circuit means coupled to said telephone lines and said switching circuit, wherein said circuit means detects the presence of ringing signals on any of said lines and renders said switching circuit conductive to actuate said signalling device at a rate corresponding to the frequency of said ringing signals.

9. A signalling circuit as defined in claim 8 wherein:

said first circuit means includes capacitive means connected to said switching circuit and said telephone line for receiving and storing a charge so that said capacitive means discharges through said signalling device when said switching circuit is rendered conductive.

10. A signalling circuit as defined in claim 9 wherein:

second circuit means detects reversals in voltage polarity across any of said telephone lines for enabling said switching circuit to transmit energy to said signalling device from the other of said telephone lines and said capacitive means.

11. A circuit for actuating a signalling device in response to receiving telephone ringing signals comprising:

a plurality of terminals for connection to a plurality of telephone lines wherein each separate terminal connects to a conductor in a different one of said telephone lines;

a common terminal for connection to another conductor in each of said plurality of telephone lines;

a control device having first and second terminals which define a unidirectional controllable current path therebetween and a third terminal for controlling the current flow through said path;

a first plurality of unidirectional current conduction devices corresponding to the number of said plurality of terminals, each having one end connected to a different one of said plurality of terminals and having the other end connected in common and wherein said conduction devices are poled for conduction in the same direction as said unidirectional current path;

a signalling device;

circuit means connecting said signalling device and the first and second terminals of said control device in a series circuit between said common connection and said common terminal, so that the control device is poled for conduction in the same direction as the plurality of unidirectional current conduction devices;

a second plurality of unidirectional current devices corresponding to the number of said plurality of terminals, each having one end connected to a different one of said plurality of terminals and having the other end connected in common and wherein the plurality of unidirectional conductive devices are poled for conduction in the same direction, and circuit means for connecting said common connection of said second plurality of said unidirectional current conduction devices to said third terminal of said control device so that a reversal of polarity at one of said polarity of terminals renders said control device conductive.

12. A circuit as defined in claim 11 wherein a capacitive means is connected to said common terminal of said first plurality of unidirectional current conduction devices so that said capacitive means is charged by the conduction of any of said devices.

13. A circuit as defined in claim 12 wherein said circuit means connecting said common connection of said second plurality of unidirectional current devices to said third terminal of said first device includes a voltage breakdown device that is rendered conductive when the signal exceeds a preset amplitude.

14. A circuit as defined in claim 13 including a plurality of resistors corresponding to the number of said plurality of terminals, a different resistor being connected between each of said plurality of terminals and the associated one of said plurality of unidirectional current conductive devices.

15. A circuit as defined in claim 14 wherein a biasing circuit means is connected between said third terminal of said control device and said series circuit.

16. A circuit as defined in claim 15 wherein said control device is a transistor and one end of said signalling device is connected to the emitter of said transistor and the other end of said signalling device is connected to said first unidirectional device.

* * * * *